US009446954B2

(12) United States Patent
Hoppe et al.

(10) Patent No.: US 9,446,954 B2
(45) Date of Patent: Sep. 20, 2016

(54) PROCESS FOR THE COUPLED PREPARATION OF TRISILYLAMINE AND POLYSILAZANES HAVING A MOLAR MASS OF UP TO 500 G/MOL

(71) Applicants: Carl-Friedrich Hoppe, Gruendau (DE); Christian Goetz, Seligenstadt (DE); Goswin Uehlenbruck, Oberursel (DE); Hartwig Rauleder, Rheinfelden (DE)

(72) Inventors: Carl-Friedrich Hoppe, Gruendau (DE); Christian Goetz, Seligenstadt (DE); Goswin Uehlenbruck, Oberursel (DE); Hartwig Rauleder, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/345,587

(22) PCT Filed: Jun. 5, 2013

(86) PCT No.: PCT/EP2013/061541
§ 371 (c)(1),
(2) Date: Mar. 18, 2014

(87) PCT Pub. No.: WO2014/191058
PCT Pub. Date: Dec. 4, 2014

(65) Prior Publication Data
US 2015/0307354 A1 Oct. 29, 2015

(30) Foreign Application Priority Data

May 27, 2013 (DE) .................. 10 2013 209 802

(51) Int. Cl.
*C01B 21/087* (2006.01)
*B01D 3/14* (2006.01)
(Continued)

(52) U.S. Cl.
CPC ............ *C01B 21/087* (2013.01); *B01D 3/143* (2013.01); *B01J 19/24* (2013.01); *C08G 77/62* (2013.01); *B01J 2219/24* (2013.01)

(58) Field of Classification Search
CPC ... C01B 21/087; B01J 19/24; B01J 2219/24; B01D 3/143; C08G 77/62
See application file for complete search history.

(56) References Cited

U.S. PATENT DOCUMENTS

| 5,120,686 A | * | 6/1992 | Gallo | ................. C07F 7/10 |
| | | | | 423/353 |
| 2010/0112749 A1 | * | 5/2010 | Park | ................. C08G 77/62 |
| | | | | 438/99 |

(Continued)

FOREIGN PATENT DOCUMENTS

| WO | WO 2012/156191 A1 | 11/2012 |
| WO | WO 2013/004423 A1 | 1/2013 |
| WO | WO 2013/087298 A1 | 6/2013 |
| WO | WO 2014/023470 A1 | 2/2014 |

OTHER PUBLICATIONS

U.S. Appl. No. 14/344,793, filed Mar. 13, 2014, Hoppe, et al.
(Continued)

*Primary Examiner* — Anthony J Zimmer
(74) *Attorney, Agent, or Firm* — Oblon, McClelland, Maier & Neustadt, L.L.P

(57) ABSTRACT

The invention relates to a process for preparing trisilylamine and polysilazanes in the liquid phase, in which ammonia is introduced in a superstoichiometric amount relative to 5 monochlorosilane which is present in an inert solvent. Here, a reaction in which trisilylamine and polysilazanes are formed proceeds. TSA is subsequently separated off in gaseous form from the product mixture. The TSA obtained is purified by filtration and distillation and obtained in high or very high purity. The bottom product mixture is conveyed from the reactor through a filter unit in which solid ammonium chloride is separated off to give a liquid mixture of polysilazanes and solvent. This is fed to a further distillation to recover solvent. As a result of the $NH_3$ being introduced in a superstoichiometric amount relative to monochlorosilane, monochlorosilane is completely reacted in the reactor. This completely prevents the reaction of monochlorosilane with additional disilylamine formed in small amounts to form solid ammonium chloride in the downstream plant parts for purification of the TSA. The solutions filtered downstream of the reactor are accordingly completely free of solids.

7 Claims, 1 Drawing Sheet

(51) Int. Cl.
  *C08G 77/62* (2006.01)
  *B01J 19/24* (2006.01)

(56) References Cited

U.S. PATENT DOCUMENTS

| | | | | |
|---|---|---|---|---|
| 2010/0310443 | A1* | 12/2010 | Miller | B01J 4/002 423/324 |
| 2013/0209343 | A1* | 8/2013 | Korolev | C01B 21/087 423/324 |
| 2014/0072497 | A1 | 3/2014 | Doering et al. | |
| 2014/0161705 | A1 | 6/2014 | Hoppe et al. | |

OTHER PUBLICATIONS

U.S. Appl. No. 14/344,801, filed Mar. 13, 2014, Hoppe, et al.
International Search Report issued Jun. 4, 2014 in PCT/EP2013/061541 (with English Translation of Category of Cited Documents).
Richard L. Wells, et al., "Studies of Silicon—Nitrogen Compounds. The Base-Catalyzed Elimination of Silane from Trisilylamine", Journal of the American Chemical Society, Bd. 88, Nr.1, Jan. 5, 1966, XP055080155, pp. 37-42.

\* cited by examiner

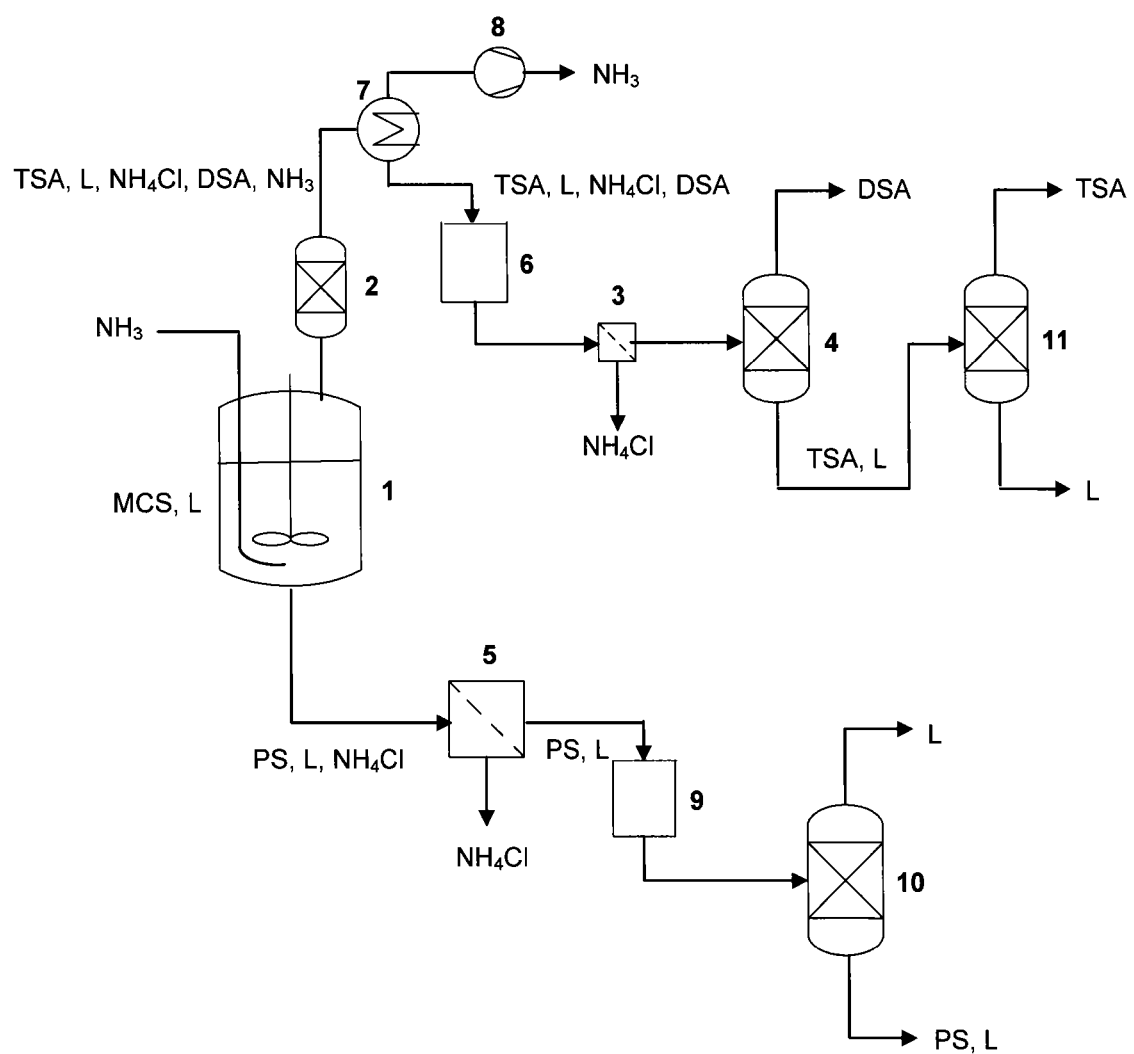

PROCESS FOR THE COUPLED PREPARATION OF TRISILYLAMINE AND POLYSILAZANES HAVING A MOLAR MASS OF UP TO 500 G/MOL

CONTINUING APPLICATION INFORMATION

The present application is a National Stage of International Application No. PCT/EP2013/061541, filed on Jun. 5, 2013.

The present invention relates to a process for preparing trisilylamine and polysilazanes having a molar mass of up to 500 g/mol in the liquid phase, in which ammonia is introduced in a superstoichiometric amount relative to monochlorosilane which is present in an inert solvent. Here, a reaction in which polysilazanes having a molar mass of up to 500 g/mol are formed in addition to trisilylamine proceeds. TSA is subsequently separated off in gaseous form from the product mixture. The TSA obtained is purified by filtration and distillation and obtained in high or very high purity. The bottom product mixture is conveyed from the reactor through a filter unit in which solid ammonium chloride is separated off to give a liquid mixture of polysilazanes and solvent. This is fed to a further distillation to recover solvent.

As a result of the NH3 being directly introduced in a superstoichiometric amount relative to monochlorosilane, monochlorosilane is completely reacted in the reactor. This completely prevents the reaction of monochlorosilane with additional disilylamine (hereinafter referred to as "DSA") formed in small amounts to form solid ammonium chloride in downstream plant parts for purification of the TSA. The solutions filtered downstream of the reactor are accordingly completely free of solids. The distillation columns used contain no solids or deposits after conclusion of the distillation operations.

Polysilazanes are polymers having a basic structure composed of silicon and nitrogen atoms in an alternating arrangement. An overview may be found, for example, in http://de.wikipedia.org/wiki/Polysilazane or in M. Weinmann, "*Polysilazanes*" in "Inorganic Polymers", edited by R. De Jaeger and M. Gleria, pp. 371-413.

In polysilazanes, each silicon atom is usually bound to two nitrogen atoms or each nitrogen atom is bound to two silicon atoms, so that they can predominantly be described as molecular chains of the formula $[R_1R_2Si—NR_3]_n$. The radicals $R_1$, $R_2$ and $R_3$ can be hydrogen atoms or organic radicals. If only hydrogen atoms are present as substituents, the polymers are referred to as perhydropolysilazanes $[H_2Si—NH]_n$. If hydrocarbon radicals are bound to the silicon and/or nitrogen, the compounds are referred to as organopolysilazanes.

Polysilazanes are colourless to yellow liquids or solids, ranging from oily via waxy to glassy, having a density of about 1 kg/l. The average molecular weight can be from a few hundred to over 100 000 g/mol. Both molecular weight and molecular macrostructure determine the state of matter and the viscosity. At a molar mass above 10 000 g/mol, the melting point is 90-140° C. High molecular weight perhydropolysilazane $[(SiH_2)NH]_x$ is a white substance resembling silicic acid. Polysilazanes can slowly age with elimination of $H_2$ and/or $NH_3$.

Relatively small molecules can be converted into larger molecules by thermal treatment. At temperatures of from 100 to 300° C., crosslinking of the molecules takes place with elimination of hydrogen and ammonia.

Polysilazanes are used as coating material and as constituent of high-temperature surface coatings of corrosion protection systems. Since they are additionally good insulators, they are used in the electronics and solar industry. In the ceramics industry, they are used as preceramic polymers. Furthermore, polysilazanes are employed for high-performance coating of steel to protect against oxidation. They are marketed as 20% strength by weight solution.

Polysilazanes can be prepared from chlorosilanes or hydrocarbon-substituted chlorosilanes and ammonia or hydrocarbon-substituted amines (apart from ammonia and amines, hydrazine can likewise be used in the reaction). The reaction forms ammonium chloride or hydrocarbon-substituted amine chlorides, which have to be separated off, in addition to the polysilazanes. The reactions are essentially spontaneous, exothermic reactions.

The preparation of polysilazanes by reaction of monochlorosilane, dichlorosilane or trichlorosilane with ammonia in each case is known in the prior art, with use of monohalosilanes, dihalosilanes or trihalosilanes being possible. Perhydropolysilazanes are formed here. When hydrocarbon-substituted starting materials are used, the formation of organopolysilazanes is expected. The high molecular weight polysilazanes obtained in the syntheses using dichlorosilanes and trichlorosilanes have a low solubility, so that they can be separated off from ammonium chloride formed at the same time only with difficulty.

When ammonia is reacted with dichlorosilane, relatively high molecular weight polysilazanes are formed directly, as disclosed in the documents CN 102173398, JP 61072607, JP 61072614, JP 10046108, U.S. Pat. No. 4,397,828, WO 91/19688. In the following reaction equation, x is at least 7.

$$3NH_3+H_2SiCl_2 \rightarrow 2NH_4Cl+[SiH_2(NH)]_x \qquad (1)$$

In the reaction of ammonia with trichlorosilane, three-dimensional structures of polysilazanes are formed directly according to the following reaction equation.

(2)

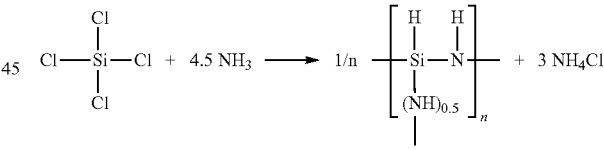

The abovementioned synthetic routes can be carried out using a solvent. A further possibility is to introduce halosilane into liquid ammonia, as provided for by the patent application WO 2004/035475. This can aid the separation of ammonium halide from the polysilazanes since the ammonium halide dissolves in ammonia while the polysilazanes form a second liquid phase. The liquids can be separated from one another by phase separation.

Apart from the preparation using halosilanes in a solvent and in liquid ammonia, there are further processes without additional formation of salts. These include catalytic dehydro coupling, redistribution reactions, ring-opening polymerizations, which are described in another reference (M. Weinmann, Polysilazanes, in Inorganic Polymers, Editors: R. De Jaeger, M. Gleria, pp. 371-413). These methods are not used industrially in order to prepare polysilazanes.

There is great interest in a commercial preparation of trisilylamine, $N(SiH_3)_3$. This is not formed in the abovementioned reaction routes. Rather, it is formed from the reaction of monochlorosilane and ammonia according to equation (3):

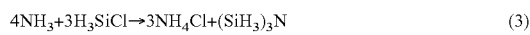

$$4NH_3 + 3H_3SiCl \rightarrow 3NH_4Cl + (SiH_3)_3N \quad (3)$$

The substance, which is abbreviated here and in the following as "TSA", is a mobile, colourless and readily hydrolysable liquid having a melting point of −105.6° C. and a boiling point of +52° C. Like other nitrogen-containing silicon compounds, TSA is an important substance in the semiconductor industry.

The use of TSA for producing silicon nitride layers has been known for a long time and is described, for example, in the documents U.S. Pat. No. 4,200,666 and JP 1986-96741. TSA is used, in particular, in chip production as layer precursor for silicon nitride or silicon oxynitride layers. A specific process for using TSA is disclosed by the patent application published under the number WO 2004/030071, in which it is made clear that the safe, malfunction-free production of TSA in constant high quality is particularly important for use in chip production.

An article in *J. Am. Chem. Soc.* 88, pages 37 ff, 1966, describes the reaction of gaseous monochlorosilane with ammonia to form TSA on a laboratory scale with slow addition of ammonia, with polysilazanes and ammonium chloride being formed at the same time. The simultaneous production of TSA and polysilazanes is therefore known in principle. However, industrial production of both substances has hitherto foundered on a series of problems. Thus, ammonium chloride is obtained in solid form and can lead to blocking of apparatuses and lines. TSA and polysilazanes can neither be separated nor produced in the purities required for the markets in which they are of interest. In addition, it has hitherto not been possible to adjust the ratio of TSA to the polysilazanes which are obtained in addition. Thus, preparation of TSA and polysilazanes in one and the same process above the laboratory scale has hitherto not been possible.

The patent application DE 10 2012 214290.8 discloses a process for the coupled preparation of polysilazanes and trisilylamine, in which TSA and polysilazanes are prepared by reaction of monochlorosilane by addition of initially a substoichiometric amount of ammonia. Subsequently, TSA is separated in gaseous form from the product mixture. Only after this is further ammonia added, so that in this step a stoichiometric excess of the total ammonia introduced relative to the amount of monochlorosilane initially charged results for the first time. Monochlorosilane is reacted incompletely as a result of the addition of the initially substoichiometric amount of ammonia in the reactor. Accordingly, in the subsequent isolation of gaseous TSA, monochlorosilane and small amounts of disilylamine formed also go into the TSA product solution. Disilylamine and monochlorosilane react with one another. This reaction proceeds slowly and is associated with the precipitation of further ammonium chloride. As a result, precipitation of ammonium chloride occurs in the TSA product solution taken off from the reactor or in the parts of the plant downstream of the reactor. Owing to the slow reaction, precipitation of ammonium chloride occurs again in the TSA product solution filtrate after the filtration. In particular, this reaction leads to ammonium chloride deposits in distillation columns employed for purifying the TSA.

It was thus an object of the invention to provide a commercially interesting process which synthesizes both products at the same time, in adjustable amounts, and with the abovementioned disadvantages and limitations being overcome entirely. A further object was to prevent the subsequent formation of ammonium chloride by reaction of monochlorosilane with disilylamine in plant parts for purifying the TSA product stream outside the reactor.

This object has unexpectedly been solved by ammonia being introduced directly and in one step in a superstoichiometric amount relative to monochlorosilane which is present in an inert solvent. Due to the introduction of a superstoichiometric amount of $NH_3$ relative to monochlorosilane, monochlorosilane is reacted completely in the reactor. The reaction of monochlorosilane with additional disilylamine formed in small amounts to give solid ammonium chloride in downstream parts of the plant is thus prevented by the introduction of a superstoichiometric amount of $NH_3$ relative to monochlorosilane. The reaction is carried out in a reactor in which polysilazanes are formed in addition to trisilylamine according to equation (3).

TSA is subsequently separated off in gaseous form from the product mixture. The TSA obtained is purified by filtration and distillation and is obtained in high or very high purity. The bottom product mixture is subsequently conveyed from the bottom of the reactor through a filter unit in which solid ammonium chloride is separated off to give a liquid mixture composed of polysilazanes and solvent. The major part of the solvent can be recovered by separation from the mixture of polysilazanes and solvent by distillation. The filtered solutions are completely free of ammonium chloride. The distillation columns used do not contain any solid ammonium chloride after the distillation.

The invention accordingly provides a process for preparing trisilylamine and polysilazanes in the liquid phase, wherein (a) at least monochlorosilane (MCS) dissolved in a solvent (L) is placed in liquid form in a reactor (1), where the solvent is inert towards monochlorosilane, ammonia, TSA, DSA and polysilazanes and has a boiling point higher than that of TSA, and (b) the reaction is carried out in the reactor (1) by introducing ammonia ($NH_3$) in a stoichiometric excess relative to monochlorosilane (MCS) into the reactor (1) and (c) the reactor is depressurized, a pressure of from 0.5 bar a to 0.8 bar a is set, the product mixture (TSA, L, $NH_4Cl$, DSA, $NH_3$) is conveyed in gaseous form from the top of the reactor (1) through a distillation unit (2), the $NH_3$ is separated off by means of a vacuum unit (8), the product mixture (TSA, L, NH4Cl, DSA) is condensed in a heat exchanger (7) and the product mixture (TSA, L, $NH_4Cl$, DSA) is collected in a vessel (6), (d) the product mixture is subsequently filtered by means of filter unit (3), with solid ammonium chloride ($NH_4Cl$) being separated off from the product mixture, and the filtrate is conveyed from the filter unit (3) into the distillation column (4)

in which DSA is separated off at the top from the mixture (TSA, L), and the mixture (TSA, L) is fed into a distillation column (11)

in which TSA is separated off at the top from the solvent (L), with the solvent being recovered, and (e) the bottom product mixture (PS, L, $NH_4Cl$) is conveyed from the reactor (1) through a filter unit (5) in which solid ammonium chloride ($NH_4Cl$) is separated off, to give a mixture of polysilazanes (PS) and solvent (L) which is collected in a vessel 9, and (f) the mixture of polysilazanes (PS) and solvent (L)

is subsequently fed to a distillation column (10) in which the major part of the solvent is recovered at the top and a concentrated mixture of polysilazanes (PS) and solvent (L) is taken off from the bottom.

The process of the invention is explained in more detail below.

The stoichiometric excess of the ammonia ($NH_3$) introduced into the reactor (1) relative to monochlorosilane is preferably selected in the range from 2 to 20%, particularly preferably from 2 to 10%. This ensures that the monochlorosilane reacts quantitatively with $NH_3$ in the reactor. The product mixture obtained in the reaction in the reactor (1) during step (b) contains ammonium chloride ($NH_4Cl$).

The inert solvent (L) used in the process of the invention is preferably selected so that ammonium halides, particularly preferably ammonium chloride, are insoluble therein. This aids both the removal of the ammonium halide, preferably the ammonium chloride, in step (d) and also the process procedure in the isolation of perhydropolysilazanes.

Preference is given to using an inert solvent which neither forms an azeotrope with TSA, DSA, nor with the polysilazanes obtained when carrying out the process of the invention. The inert solvent should preferably be less volatile than TSA. Such preferred solvents can be selected from among pyridine, tetrahydrofuran, diethylene glycol dimethyl ether, triethylene glycol dimethyl ether, tetraethylene glycol dimethyl ether, toluene, xylene and/or dibutyl ether.

Very particular preference is given to using toluene as solvent (L). If monochlorosilane dissolved in toluene is placed in liquid form in the reactor and ammonia is introduced into the reactor as shown in FIG. 1, TSA, polysilazanes, ammonium chloride and small amounts of DSA are formed. TSA, polysilazanes and DSA are stable in toluene. In addition, ammonium chloride is sparingly soluble in toluene, which aids the removal of ammonium chloride by means of filtration.

Furthermore, toluene serves to dilute the reactor solution and to take up the enthalpy of reaction.

It can be advantageous to use the solvent (L), preferably toluene, in a volume excess over monochlorosilane (MCS) in the process of the invention. Preference is given to setting a volume ratio of the liquids solvent to monochlorosilane of from 30:1 to 1:1, preferably from 20:1 to 3:1, particularly preferably from 10:1 to 3:1. However, at volume ratios in the range from 3:1 to 1:1, the advantages become smaller. This excess ensures high dilution of monochlorosilane and this in turn increases the yield of TSA. A further advantage of using L in a volume excess over monochlorosilane (MCS) is that the concentration of ammonium chloride in the reaction solution is reduced and the stirring and emptying of the reactor is therefore made easier. However, excessively large excesses, e.g. above 30:1, decrease the space-time yield in the reactor.

To carry out the reaction, the reactor is preferably filled to up to 99%, more preferably from 5 to 95%, particularly preferably from 20 to 80%, of the reactor volume with reaction mixture of the starting materials and the solvent.

The reaction of the reaction mixture in the reactor is advantageously carried out at a temperature of from −60 to +40° C., preferably from −20 to +10° C., particularly preferably from −20 to +5° C., very particularly preferably from −15 to 0° C. The reaction can be carried out at a pressure of from 0.5 to 15 bar, in particular at the pressure established under the prescribed reaction conditions. The polysilazanes (PS) obtained are chlorine-free. They are thus perhydropolysilazanes.

The reaction is preferably carried out under protective gas, for example nitrogen and/or a noble gas, preferably argon, and in the absence of oxygen and water, in particular in the absence of moisture, with the plant employed preferably being dried and flushed with protective gas before the first charging operation.

Furthermore, the vapour/liquid equilibrium pressure of a corresponding mixture of monochlorosilane and to a smaller measure the trisilylamine formed, the polysilazanes and the DSA formed in small amounts in the solvent is essentially established during the reaction in the reactor due to the initial charge of liquid monochlorosilane dissolved in the solvent. Ammonia does not have any effect on the vapour/liquid equilibrium pressure as long as ammonia reacts fully with the monochlorosilane present on introduction. Furthermore, the solubility of ammonia in toluene is 13.7 g/l (at 1 bar a and 0° C.).

After the reaction in step (b), the reactor is depressurized, a pressure of from 0.5 bar a to 0.8 bar a is set and the product mixture (TSA, L, $NH_4Cl$, DSA, $NH_3$) is conveyed in gaseous form from the top of the reactor (1) through a distillation unit (2).

Excess ammonia is discharged by means of a vacuum pump during the condensation of the product mixture (TSA, L, $NH_4Cl$, DSA).

In the process of the invention, the distillate obtained after step (c) can preferably be filtered by means of filter unit (3), with solid ammonium chloride ($NH_4Cl$) being separated off from the distillate, this filtrate is conveyed from the filter unit (3) into the distillation column (4) in which DSA is separated off at the top from the mixture (TSA, L) and the mixture (TSA, L) is fed into a distillation column (11) in which TSA is separated off at the top from the solvent (L). The advantage is that TSA is in this way obtained in a purity of over 99.5% by weight.

The polysilazanes present in the reactor (1) are chlorine-free as a result of the introduction of ammonia in a super-stoichiometric amount.

The perhydropolysilazanes preferably have a molar mass of from 120 to 300 g/mol. The product mixture obtained according to the invention can also comprise novel perhydropolysilazanes for which there are not yet any CAS numbers. Examples of structural formulae are shown in Table 1.

TABLE 1

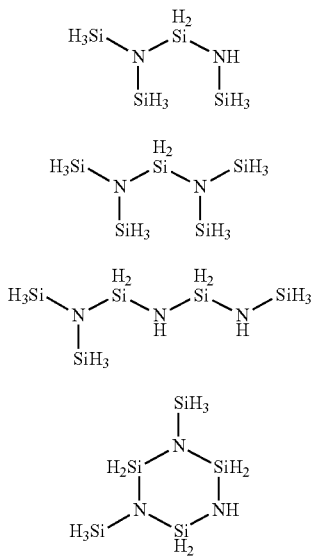

TABLE 1-continued

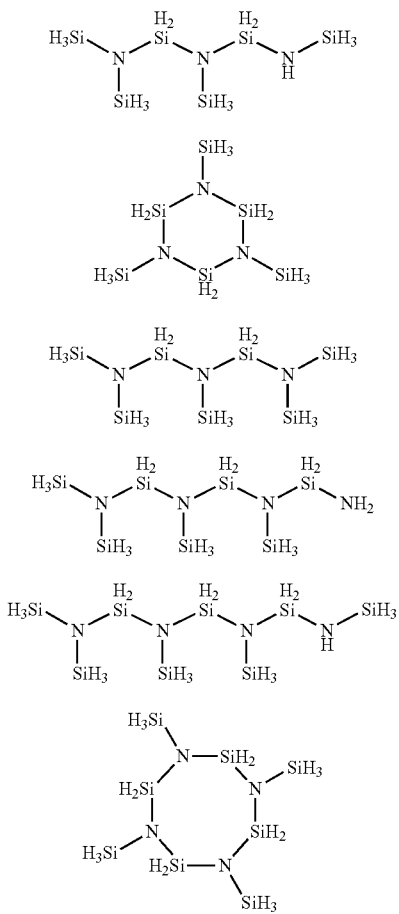

In step (e), the bottom product mixture, which contains perhydropolysilazanes, toluene and ammonium chloride, is conveyed from the reactor (1) through a filter unit (5) in which solid ammonium chloride is separated off from the product mixture. The advantage in relation to the use of MCS in step (a) is that the filtration to separate off ammonium chloride from the perhydropolysilazanes having a molar mass of up to 500 g/mol is readily possible. Filtration to separate off ammonium chloride from polysilazanes having significantly higher molar masses would not be effected completely, but is also superfluous in the process of the invention since polysilazanes having molar masses significantly higher than 500 g/mol are only formed when dichlorosilane and/or trichlorosilane have been initially charged instead of or in addition to MCS in step (a).

The major part of the solvent is subsequently vaporized from the mixture of polysilazanes and solvent by distillation in order to recover the solvent and increase the proportion of polysilazanes in the mixture. The concentrated solution can subsequently be taken up again in any solvent, preferably toluene or dibutyl ether, and a concentration matching the commercial demand can be set in this way. For example, a 2% strength by weight solution can be concentrated to 10% by weight and subsequently diluted down to 5% by weight again by means of toluene or dibutyl ether. This embodiment of the process of the invention allows the solvent to be changed and/or mixtures of polysilazanes and a plurality of, at least two, solvents to be provided. The concentration of the polysilazanes obtained according to the invention can likewise be set in a targeted way, for example after an imprecise distillation.

The process of the invention is carried out batchwise in respect of the reaction, distillation of the product mixture (TSA, L, $NH_4Cl$, DSA, $NH_3$) from the reactor, drainage and filtration of the bottom product mixture (PS, L, $NH_4Cl$). The process of the invention is carried out continuously in respect of filtration and distillation of the product mixture (TSA, L, $NH_4Cl$, DSA) and distillation of the filtered bottom product mixture (PS, L). Opportunities for recirculating components, in particular the solvent, after the distillations into the distillation columns (10), (11) can be utilized in this way.

It can be advantageous to carry out the filtration of the bottom product mixture (PS, L, $NH_4Cl$) in step (e) of the process of the invention at a temperature of less than or equal to room temperature, particularly preferably at room temperature, giving a clear filtrate, and/or carrying out the distillation of the mixture of polysilazanes (PS) and solvent (L) in step (f) at 0.5 bar a.

The advantage of the option in step (f) is that the polysilazanes are subjected to only mild thermal conditions. Such an advantage is likewise obtained at other subatmospheric pressures in step (f).

For the purposes of the invention, room temperature is a temperature of 20° C.

In step (f), the amount of solvent which can be distilled off can particularly preferably be selected freely according to the knowledge of a person skilled in the art, taking care to ensure that no polysilazanes go over at the top or that the viscosity of the bottoms does not increase greatly. If toluene is used as solvent (L), the process of the invention has the particular advantage that, even at a reflux ratio below the conventional range from 2 to 15, namely preferably 1, pure toluene can be taken off at the top.

The invention likewise provides a plant for reaction of the starting materials at least monochlorosilane (MCS) in a solvent (L) and ammonia in the liquid phase to form a product mixture containing trisilylamine and polysilazanes, which comprises a reactor (1) having feed lines for the components ammonia, at least monochlorosilane and solvent (L) and an outlet for product mixture (TSA, L, $NH_4Cl$, DSA, NH3), which opens into a distillation unit (2) downstream of the reactor (1), a downstream heat exchanger (7) having an attached vacuum pump (8) and a vessel (6) which is equipped with a line to a filter unit (3) which has at least one
solids outlet for $NH_4Cl$ and
a further line for transfer of the filtrate which opens into a distillation column (4) which is equipped with an outlet at the top for DSA and a discharge facility for the mixture (TSA, L) from the bottom, which opens into a distillation column (11) which is equipped with an outlet at the top for TSA and a discharge facility for the solvent (L) from the bottom, and a discharge facility from the bottom of the reactor for the bottom product mixture (PS, L, $NH_4Cl$), which opens into a downstream filter unit (5) which has at least one solids outlet for $NH_4Cl$ and a further line for transfer of the filtrate consisting of polysilazanes and solvent into a vessel (9) to which a distillation column (10) is in turn connected, which distillation column is equipped with an outlet at the top for solvent and a discharge facility for a concentrated mixture of polysilazanes (PS) and solvent (L) from the bottom.

The plant according to the invention provides TSA and polysilazane solution in high purity.

The plant of the invention is shown schematically in FIG. 1. The reference numerals have the following meanings 1 Reactor
2 Distillation unit
3 Filter unit
4 Distillation column
4 Filter unit
6 Vessel
7 Heat exchanger
8 Vacuum pump
9 Vessel
10 Distillation column
11 Distillation column The distillation unit (2) is, for the purposes of the invention, a packed column. It partially condenses out toluene and thus increases the TSA content in the gas phase taken off from the reactor in step (c).

The proportion of DSA in the filtrate from the filter unit (3) is reduced or removed by means of the distillation column (4). The distillation column (11) is used in the process of the invention in order to produce the TSA in the desired purity.

The parts of the plant according to the invention which come into contact with the materials used according to the invention are preferably made of stainless steel and can be heated or cooled in a regulated manner.

In a further embodiment of the process of the invention, dichlorosilane (DCS) can additionally also be mixed, in step (a), into the MCS dissolved in a solvent (L). Thus, in step (a), a mixture of MCS and DCS dissolved in a solvent (L) can be initially charged in liquid form in the reactor (1).

In this case, MCS and DCS are completely reacted with ammonia in the reactor (1) in the process of the invention. In this way, reaction of MCS and/or DCS with disilylamine to form ammonium chloride in downstream plant parts for purification of the TSA is completely prevented. In the process of the invention, the solutions which have been filtered downstream of the reactor are completely free of solids. Distillation columns used contain neither solids nor deposits after conclusion of the distillation operations.

If a mixture of MCS and DCS is used in step (a), polysilazanes having a higher molar mass than when pure monochlorosilane is used are obtained. Such polysilazanes are not shown in Table 1. However, the TSA yield is lower than when pure monochlorosilane is used because of the presence of DCS.

The process of the invention thus has the advantage of being tolerant to mixing of DCS into the MCS in step (a) and has the advantage that, even in the case of such additions, neither solids nor deposits are formed in plant parts for purification of the TSA downstream of the reactor.

The process of the invention will be illustrated below with the aid of examples.

EXAMPLE 1

3400 ml of toluene and subsequently 453 g of monochlorosilane which additionally contained 34 g of dichlorosilane were introduced into a 5 l stirring autoclave which had cooling and heating modes and had previously been flushed with inert gas. 196 g of ammonia were introduced into the solution over a period of 6.5 hours. During the addition, the temperature was a constant −15° C. The pressure during the addition time was a constant 3.1 bar a.

A pressure of 0.5 bar a was subsequently set in the reactor and the stirring autoclave was heated. 58 g of TSA containing proportions of toluene and traces of ammonium chloride, DSA were distilled off by means of an attached distillation column. Filtration and subsequent distillation gave TSA in a purity of over 99.5% by weight.

The solution of polysilazanes, toluene and ammonium chloride which was still present in the stirring autoclave was drained off and filtered. The solution of polysilazanes and toluene was subsequently fed to a distillation column from which pure toluene was distilled off at the top and a solution of toluene containing an increased proportion of polysilazane was taken off from the bottom.

The filtered solutions were completely free of solids. The distillation columns used contained no solids or deposits after conclusion of the distillation operations.

EXAMPLE 2

3400 ml of toluene and subsequently 463 g of monochlorosilane which additionally contained 19 g of dichlorosilane were introduced into a 5 l stirring autoclave which was provided with cooling and heating modes and had previously been flushed with inert gas. 192 g of ammonia were introduced into the solution over a period of 6.5 hours. The temperature remained at a constant −15° C. during the addition. The pressure increased from 3.2 to 3.9 bar a during the addition time.

A pressure of 0.5 bar a was subsequently set in the reactor and the stirring autoclave was heated. 81 g of TSA containing proportions of toluene and traces of ammonium chloride, DSA were distilled off by means of an attached distillation column. Filtration and subsequent distillation gave TSA having a purity of over 99.5% by weight.

The solution of polysilazanes, toluene and ammonium chloride which was still present in the stirring autoclave was drained off and filtered. The solution of polysilazanes and toluene was subsequently fed to a distillation column from which pure toluene was distilled off at the top and a solution of toluene having an increased proportion of polysilazane was taken off from the bottom.

The filtered solutions were completely free of solids. The distillation columns used contained no solids or deposits after conclusion of the distillation operations.

EXAMPLE 3

3400 ml of toluene and subsequently 429 g of monochlorosilane which additionally contained 54 g of dichlorosilane were introduced into a 5 l stirring autoclave which was provided with heating and cooling modes and had previously been flushed with inert gas. 197 g of ammonia were introduced into the solution over a period of 6.5 hours. The temperature was a constant 0° C. during the addition. The pressure dropped from 4.3 to 4.2 bar a during the addition time.

A pressure of 0.5 bar a was subsequently set in the reactor and the stirring autoclave was heated. 47 g of TSA containing proportions of toluene and traces of ammonium chloride, DSA were distilled off by means of an attached distillation column. Filtration and subsequent distillation gave TSA having a purity of over 99.5% by weight.

The solution of polysilazanes, toluene and ammonium chloride which was still present in the stirring autoclave was drained off and filtered. The solution of polysilazanes and toluene was subsequently fed to a distillation column from which pure toluene was distilled off at the top and a solution of toluene having an increased proportion of polysilazane was taken off from the bottom.

The filtered solutions were completely free of solids. The distillation columns used contained no solids or deposits after conclusion of the distillation operations.

The invention claimed is:

1. A liquid phase process for preparing trisilylamine and polysilazanes, comprising
   (a) charging monochlorosilane (MCS) as a solution in a solvent (L) to a reactor (1)
   (b) introducing ammonia ($NH_3$) in a stoichiometric excess relative to the monochlorosilane (MCS) into the reactor (1) to conduct reaction and obtain a product mixture comprising trisilylamine (TSA), L, $NH_4Cl$, disilylamine (DSA), $NH_3$ and polysilazanes (PS);
   (c) depressurizing the reactor and setting the reactor to a pressure of from 0.5 bar to 0.8 bar;
   (d) conveying a mixture of TSA, L, $NH_4Cl$, DSA, and $NH_3$ in gaseous form from the top of the reactor (1) through a distillation unit (2), wherein the $NH_3$ is separated off under reduced pressure provided by a vacuum unit (8) to obtain a gaseous product mixture of TSA, L, NH4Cl and DSA;
   (e) condensing the gaseous product mixture comprising TSA, L, NH4Cl, and DSA in a heat exchanger (7) to obtain a condensed product mixture;
   (f) collecting the condensed product mixture (TSA, L, $NH_4Cl$, DSA) in a vessel (6),
   (g) filtering the condensed product mixture through filter unit (3), wherein solid ammonium chloride ($NH_4Cl$) is separated off from the filtrate comprising TSA, L and DSA;
   (h) conveying the filtrate from the filter unit (3) into a distillation column (4) in which the DSA is separated off at the top and the TSA and L are conveyed into a distillation column (11) in which TSA is separated off at the top from the solvent (L);
   (i) recovering the solvent (L);
   (j) conveying a product mixture comprising PS, L and $NH_4Cl$ from the bottom of the reactor (1) through a filter unit (5) in which solid ammonium chloride ($NH_4Cl$) is separated off, to obtain a mixture of polysilazanes (PS) and solvent (L) which is collected in a vessel 9; and
   (k) conveying the mixture of polysilazanes (PS) and solvent (L) to a distillation column (10) in which the solvent is recovered at the top and a mixture of polysilazanes (PS) is obtained from the bottom of the distillation column;
   wherein the solvent (L) is inert towards monochlorosilane, ammonia, trisilylamine (TSA), disilylamine (DSA) and polysilazanes (PS) and has a boiling point higher than that of TSA.

2. The process of claim 1, wherein the stoichiometric excess of the ammonia ($NH_3$) introduced into the reactor (1) relative to the monochlorosilane is from 2 to 20%.

3. The process of claim 1, wherein the solvent (L) is toluene.

4. The process of claim 1, wherein the solvent (L) is in a volume excess over monochlorosilane (MCS).

5. The process of claim 1, wherein a temperature of the reaction in the reactor (1) is from −60 to +40° C.

6. The process of claim 1, wherein
   a temperature of the filtration of the product mixture (PS, L, $NH_4Cl$) from the bottom of the reactor is less than or equal to room temperature, and a clear filtrate is obtained, and/or
   a pressure of the distillation of the mixture of polysilazanes (PS) and solvent (L) is 0.5 bar.

7. A plant to conduct the liquid phase process of claim 1, comprising:
   a reactor (1) having feed lines for ammonia, MCS and (L), an outlet for product mixture (TSA, L, $NH_4Cl$, DSA, $NH_3$), which opens into a distillation unit (2) downstream of the reactor (1), and a discharge facility from the bottom of the reactor which opens into a downstream filter unit (5);
   a heat exchanger (7) having an attached vacuum pump (8) and a vessel (6) which is equipped with a line to a filter unit (3) which has at least one solids outlet for $NH_4Cl$ and a further line for transfer of a filtrate which opens into
   a distillation column (4) which is equipped with an outlet at the top and a discharge facility from the bottom, which opens into
      a distillation column (11) which is equipped with an outlet at the top and a discharge facility from the bottom,
   wherein the downstream filter unit (5) has at least one solids outlet and a further line for transfer of the filtrate which opens into a vessel (9) and then a distillation column (10),
   wherein distillation column (10) is equipped with an outlet at the top and a discharge facility from the bottom.

* * * * *